(12) United States Patent
Pan et al.

(10) Patent No.: US 12,165,354 B2
(45) Date of Patent: Dec. 10, 2024

(54) POSE ESTIMATION METHOD AND DEVICE, RELATED EQUIPMENT AND STORAGE MEDIUM

(71) Applicant: Beijing Tusen Zhitu Technology Co., Ltd., Beijing (CN)

(72) Inventors: Liangliang Pan, Beijing (CN); Ji Zhao, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 351 days.

(21) Appl. No.: 17/654,368

(22) Filed: Mar. 10, 2022

(65) Prior Publication Data

US 2022/0292711 A1    Sep. 15, 2022

(30) Foreign Application Priority Data

Mar. 10, 2021  (CN) .......................... 202110258991.3

(51) Int. Cl.
*G06T 7/73*     (2017.01)
*G06T 7/246*    (2017.01)
(Continued)

(52) U.S. Cl.
CPC .............. *G06T 7/73* (2017.01); *G06T 7/246* (2017.01); *G06T 7/33* (2017.01); *G06T 7/38* (2017.01); *G06V 20/58* (2022.01)

(58) Field of Classification Search
CPC .. G06T 7/73; G06T 7/246; G06T 7/33; G06T 7/38; G06T 2207/30256; G06T 7/75;
(Continued)

(56) References Cited

U.S. PATENT DOCUMENTS

2014/0333741 A1* 11/2014 Roumeliotis ........... G06T 7/246
                                                              348/61
2014/0336848 A1* 11/2014 Saund .................... G06V 20/13
                                                              701/3
(Continued)

FOREIGN PATENT DOCUMENTS

CN       110057352 A      7/2019
CN       110349215 A     10/2019
(Continued)

OTHER PUBLICATIONS

Modeling Varying Camera-IMU Time Offset in Optimization-Based Visual-Inertial Odometry—2018 (Year: 2018).*
(Continued)

*Primary Examiner* — Nizar N Sivji
(74) *Attorney, Agent, or Firm* — Perkins Coie LLP

(57) ABSTRACT

The present application discloses a pose estimation method and device, related equipment and a storage medium. In the pose estimation method, a visual observation model constraint is constructed according to images, a motion model constraint is constructed according to inertial data, and a pose of a camera, an inertial measurement unit or an object that corresponds to the time of each image is calculated according to the visual observation model constraint and the motion model constraint. The pose estimation method adopts a fusion model of the visual observation model constraint and the motion model constraint to improve the accuracy, stability and robustness of pose estimation in a complex scene.

19 Claims, 6 Drawing Sheets

(51) Int. Cl.
  *G06T 7/33* (2017.01)
  *G06T 7/38* (2017.01)
  *G06V 20/58* (2022.01)

(58) Field of Classification Search
  CPC . G06T 2207/10016; G06T 2207/30241; G06T 2207/30244; G06T 7/70; G06T 7/20; G06V 20/58; G01C 21/165
  See application file for complete search history.

(56) References Cited

U.S. PATENT DOCUMENTS

| | | | |
|---|---|---|---|
| 2018/0339709 | A1 | 11/2018 | Tiwari et al. |
| 2019/0251696 | A1* | 8/2019 | Wang .................. G02B 27/017 |
| 2019/0368879 | A1* | 12/2019 | Roumeliotis ........... G06T 7/277 |
| 2020/0302615 | A1* | 9/2020 | Lin ........................ G06T 17/00 |
| 2021/0012520 | A1* | 1/2021 | Zhou ...................... B64U 20/87 |
| 2022/0277476 | A1* | 9/2022 | Sagong ................... G06F 3/011 |
| 2023/0074368 | A1* | 3/2023 | Rankawat .............. G05D 1/249 |

FOREIGN PATENT DOCUMENTS

| | | | | |
|---|---|---|---|---|
| CN | 111795692 | A | 10/2020 | |
| CN | 109084732 | B | 1/2021 | |
| CN | 110207714 | B | 1/2021 | |
| CN | 112230242 | A | 1/2021 | |
| EP | 3158417 | B1 * | 9/2019 | ........... B64C 39/024 |
| WO | WO-2022077296 | A1 * | 4/2022 | |

OTHER PUBLICATIONS

European Patent Office, Extended European Search Report for EP 22160198.2, Mailing Date: Aug. 12, 2022, 11 pages.

Yonggen Ling, et al., "Modeling Varying Camera-IMU Time Offset in Optimization-Based Visual-Inertial Odometry", Springer Nature Switzerland AG 2018, pp. 491-507, Tencent AI Lab, Shenzhen, China.

* cited by examiner

POSE ESTIMATION METHOD AND DEVICE, RELATED EQUIPMENT AND STORAGE MEDIUM

The present disclosure claims priority to Chinese Patent Application No. 202110258991.3, titled "POSE ESTIMATION METHOD AND DEVICE, RELATED EQUIPMENT AND STORAGE MEDIUM", filed on Mar. 10, 2021, the content of which is incorporated herein by reference in its entirety.

TECHNICAL FIELD

The present disclosure relates to the field of autonomous driving, and in particular to a pose estimation method and device, movable equipment, computing equipment and a computer-readable storage medium.

BACKGROUND

Visual positioning technology is used to obtain position and posture (or rotation) of a camera at the time of image shoot, and is widely applied in the fields of autonomous driving, robots, unmanned aerial vehicles, wearable equipment, VR glasses and the like. In the scene of autonomous driving, a camera is installed on a vehicle, and positioning and navigation of the vehicle are achieved according to images shot by the camera in combination with an artificial intelligence algorithm. Shaking, jolting, sudden braking, sudden turning and the like in the traveling process of the vehicle will give rise to severe jitter, rotation and other problems to the camera. Therefore, how to obtain an accurate pose becomes an urgent technical problem to be solved.

Existing pose estimation methods, for example, employ a fusion optimization method based on images acquired by a camera and global positioning data. However, the accuracy and stability of this fusion optimization method are limited by the state of the global positioning system (GPS), and signal hopping will occur in a scene occluded by tunnels and tall buildings, which directly leads to a drift in the camera pose estimation result. Further, since the camera pose estimation of images of consecutive frames are all based on the estimation results of the previous frame, pose errors will be propagated and accumulated in the system, which further leads to an increased drift in the camera pose estimation result.

SUMMARY

In view of the above-described problems, an object of the present disclosure is to provide a pose estimation method and device, related equipment and a storage medium, wherein a fusion model of a visual observation model constraint and a motion model constraint is adopted to improve the accuracy, stability and robustness of pose estimation in a complex scene.

According to a first aspect of the present disclosure, provided is a pose estimation method, comprising: receiving multi-frame images acquired by a camera and inertial data acquired by an inertial measurement unit in a moving process of an object, the camera and the inertial measurement unit being fixedly installed on the object; constructing a visual observation model constraint according to the images; constructing a motion model constraint according to the inertial data; and calculating a pose of the camera, the inertial measurement unit or the object that corresponds to the time of each image frame according to the visual observation model constraint and the motion model constraint.

According to a second aspect of the present disclosure, provided is a pose estimation device, comprising: a data receiving module, configured to receive multi-frame images acquired by a camera and inertial data acquired by an inertial measurement unit in a moving process of an object, the camera and the inertial measurement unit being fixedly installed on the object; a first construction module, configured to construct a visual observation model constraint according to the images; a second construction module, configured to construct a motion model constraint according to the inertial data; and a pose calculation module, configured to obtain a pose of the camera, the inertial measurement unit or the object that corresponds to the time of each image frame according to the visual observation model constraint and the motion model constraint.

According to a third aspect of the present disclosure, provided is movable equipment, comprising: the pose estimation device described above; and a camera and an inertia measurement unit fixedly installed on the movable equipment and configured to acquire multi-frame images and inertia data in a moving process of the movable equipment.

According to a fourth aspect of the present disclosure, provided is computing equipment, comprising a memory and one or more processors in communication with the memory, wherein the memory stores instructions executable by the one or more processors therein, and the instructions are executed by the one or more processors to cause the one or more processors to implement the method described above.

According to a fifth aspect of the present disclosure, provided is a computer-readable storage medium storing a computer program thereon, wherein the computer program is executed by a processor to implement the method described above.

The pose estimation method provided by the embodiments of the present disclosure adopts a fusion model of the visual observation model constraint and the motion model constraint to estimate the pose. Since the inertial data acquired by the inertial measurement unit are generally not influenced by environmental changes, the pose estimation method can provide consecutive pose estimation results when the environment changes. Since the acquisition frame rate of the inertial measurement unit is higher than that of the camera, the pose estimation method can improve the real-time performance of pose estimation. Since there is a complex scene in a moving process of an object, the position information of the global positioning system may be temporarily lost due to the shielding by tunnels and tall buildings, or semantic features may be temporarily lost due to the shielding by an obstacle or severe weather. The pose estimation method is based on a fusion model of the visual observation model constraint and the motion model constraint, and can acquire consecutive and reliable pose estimation results in the complex scene, so that the accuracy, real-time performance, stability and robustness of pose estimation in the complex scene can be improved.

In a preferred embodiment, the global visual observation model constraint employs a normalized camera coordinate system, wherein the world coordinate system is transformed to an inertial measurement unit (IMU) coordinate system and the IMU coordinate system is transformed to a camera coordinate system. In the case that the global visual observation model constraint is subjected to fusion optimization together with the motion model constraint, the accuracy of pose estimation can be further improved.

In a preferred embodiment, the state variable of the inertial measurement unit is initialized according to visual-only camera pose prediction, and then the pose is estimated using a fusion model of the visual observation model constraint and the motion model constraint. The initialization of the state variable of the inertial measurement unit can achieve quick decoupling, which can further accelerate the convergence of fusion optimization.

In a preferred embodiment, the visual observation model constraint comprises at least one of a local visual observation model constraint and a global visual observation model constraint. Among them, the local visual observation model constraint is constructed according to the registration errors of the features between the multi-frame images, and the global visual observation model constraint is constructed according to the registration errors of the features of the images and the map. Among them, the features, for example, may comprise at least one of a semantic feature, a geometric feature, a spatial relationship feature, and a shape feature. The features of the multi-frame images may also comprise at least one of a color feature and a texture feature of the images. It is certainly not limited to this, and those skilled in the art may add other image features as needed, which is not limited by the present disclosure. In the application scene of autonomous driving, lane lines are a consecutive feature of a road, and a consecutive pose estimation result is obtained based on the lane line constraint, so that the accuracy, stability and robustness of pose estimation in the complex scene can be improved.

The pose estimation device, the computing equipment and the computer-readable storage medium provided by the embodiments of the present disclosure are configured to execute the position estimation method. The movable equipment provided by the embodiments of the present disclosure adopts the pose estimation method to obtain a camera pose and positions the equipment according to the camera pose, so that the accuracy, stability and robustness of equipment positioning can be improved.

BRIEF DESCRIPTION OF THE DRAWINGS

The above and other objects, features and advantages of the present disclosure will become more apparent by the following description of the embodiments of the present disclosure with reference to the drawings. In the drawings.

DETAILED DESCRIPTION

Figure 1:
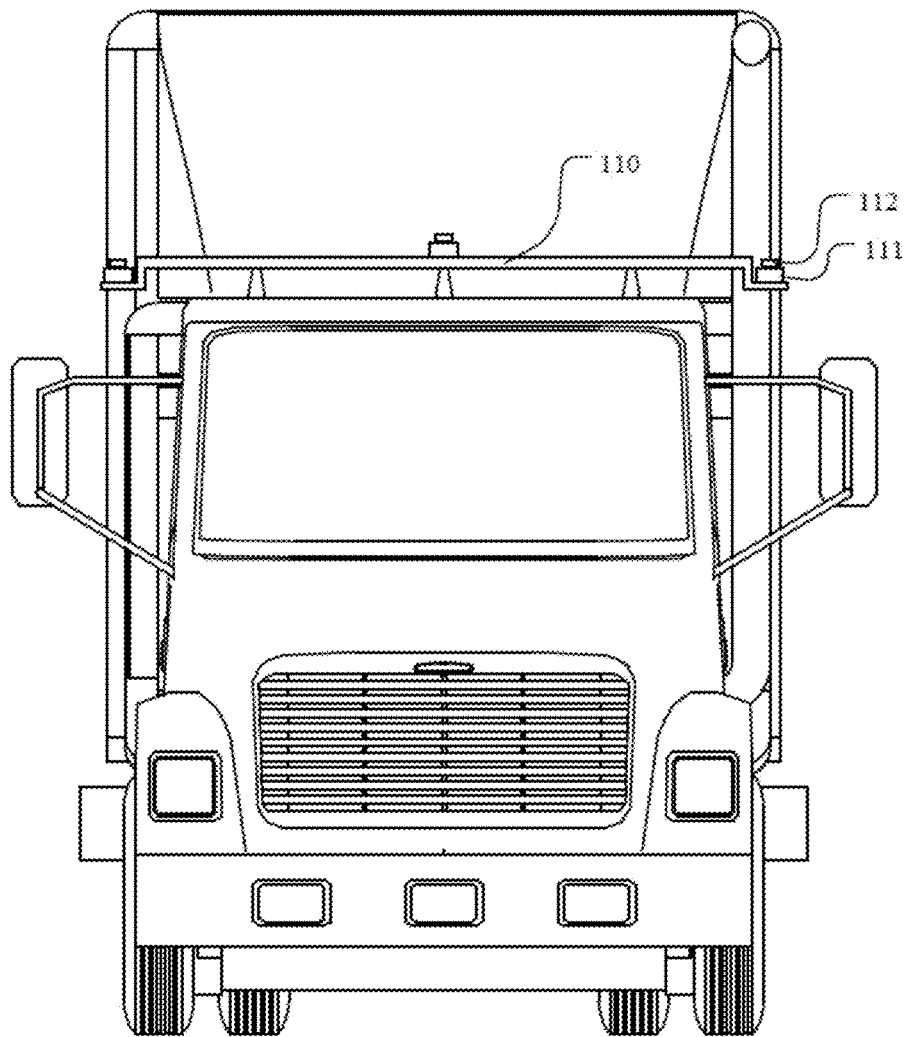
FIG. 1 shows a front view of a vehicle with a sensor installed on a sensor holder.

In order to enable those skilled in the art to better understand the technical solutions of the present disclosure, the technical solutions in the embodiments of the present disclosure will be clearly and completely described below with reference to the drawings in the embodiments of the present disclosure. It is obvious that the described embodiments are only part of the embodiments of the present disclosure rather than all of the embodiments. All other embodiments obtained by those skilled in the art without making any creative effort based on the embodiments of the present disclosure shall fall within the protection scope of the present disclosure.

The terms used in the present application are defined as follows:

IMU stands for Inertial Measurement Unit, which is internally provided with a three-axis gyroscope (configured to measure a three-axis deflection angle) and a three-axis accelerometer (configured to measure a three-axis acceleration).

GPS stands for Global Positioning System.

GNSS stands for Global Navigation Satellite System.

Pose comprises the general term of the position and posture (or rotation) of any object and comprises 6 freedom degrees, namely 3 position freedom degrees and 3 orientation freedom degrees, wherein the 3 orientation freedom degrees are usually represented by Pitch angle (Pitch), Roll angle (Roll), and Yaw angle (Yaw), and for example, the camera, the inertial measurement unit, and the vehicle have their own poses respectively.

State variable comprises the general term of motion parameters associated with pose estimation of any object, comprising displacement, velocity, direction, gyroscope bias, jitter factor, and the like.

Visual observation comprises visual data acquired by the system, for example, images acquired by a camera.

Motion comprises motion data obtained by the system, for example, inertial data acquired by using an inertial measurement unit.

Inertial data comprises acceleration and rotation angle data output by the inertial measurement unit.

Semantic feature comprises a target feature detected and identified out in the map and in the images acquired by the camera, for example, lane lines and signs (i.e., traffic signs) marked in the images.

Semantic map comprises a high-precision map that has marked semantic features, for example, solid lane lines, dashed lane lines and signs marked in the map.

Residual errors represent errors between actual observed values and estimated values in mathematical statistics, and the optimized camera pose parameters can be obtained by carrying out a least squares solution on residual errors of the camera pose estimation expressions.

Time sliding window comprises a fixed-time-period data structure for dynamic update and is used to store state variables and observation data for joint optimization at each time point. A time sliding window generally comprises a plurality of image frames, or it can be said a plurality of images constitute a time sliding window. For example, the sliding window slides from the first image to the last image, and every m images may constitute a sliding window. Further, each image having its corresponding time (or timestamps). The time/timestamps of an image frame may comprise at least one of: a trigger time at which the camera is triggered; an exposure time at which the image is exposed; an acquisition time at which the camera acquires the image; a sending time at which the camera sends the image to a computing device; or a receiving time at which the computing device receives the image. And the time of the images in the application belongs to a same type of time. That is, if an image adopts acquisition time as reference, then other images will also adopt the acquisition time as reference. The sliding window also comprises inertial data within the time-period of the sliding window. Generally, the IMU acquisition frequency is higher than the image acquisition frame rate, so there is a certain number of image frames within a time sliding window, and there is a number of inertial data samples between the times of the adjacent images.

In the embodiments of the present disclosure, the camera pose estimation method and device for a vehicle are used as examples to illustrate. However, the pose estimation method and device of the present disclosure are not limited to this, and also may be applied to any object such as a robot, an unmanned aerial vehicle, wearable equipment and VR glasses. The present application does not define the application scene of the technical solution.

Specific embodiments of the present disclosure are further described in detail below with reference to the drawings and the embodiments.

FIG. 1 shows a front view of a vehicle with a sensor installed on a sensor holder. The vehicle 100 may be a car, a truck, a motorcycle, a bus, a watercraft, an aircraft, a helicopter, a lawn mower, an excavator, a snowmobile, an aircraft, a recreational vehicle, an amusement park vehicle, farming equipment, construction equipment, a tramcar, a golf cart, a train, a trolleybus, or other vehicles.

The vehicle 100 may be operated fully or partially in an autonomous driving mode. The vehicle 100 can control itself in the autonomous driving mode. For example, the vehicle 100 can determine a current state of the vehicle and a current state of an environment in which the vehicle is located, determine a predicted behavior of at least one other vehicle in this environment, and determine a trust level corresponding to a likelihood that the at least one other vehicle performs the predicted behavior, and thus the vehicle 100 can control itself based on this determined information. The vehicle 100, when in the autonomous driving mode, can be operated without human interaction.

The vehicle 100 may comprise various vehicle systems, such as a driving system, a sensor system, a control system, a user interface system, a computing system, and a communication system. The vehicle may comprise more or fewer systems, each of which may comprise a plurality of units. Further, each system and unit of the vehicle may be interconnected. For example, the computing system can be in data communication with one or more of the driving system, the sensor system, the control system, the user interface system, or the communication system. Thus, one or more of the described functions of the vehicle 100 may be divided into additional functional or physical components or combined into a fewer number of functional or physical components.

The driving system of the vehicle 100 may comprise a plurality of operable components (or units) that provide kinetic energy for the vehicle 100. In an embodiment, the driving system may comprise an engine or a motor, wheels, a speed changer, an electronic system, and power (or a source of power). The engine or motor may be any combination of the following devices: an internal combustion engine, an electrical machine, a steam engine, a fuel cell engine, a propane engine, or other forms of engines or motors. In some embodiments, the engine may transform a source of power into mechanical energy. In some embodiments, the driving system may comprise a variety of engines or motors. For example, a hybrid electric vehicle may comprise a gasoline engine and a motor, and may also comprise other combinations.

The sensor system of the vehicle 100 may comprise a plurality of sensors for sensing information of the environment and conditions of the vehicle 100. For example, the sensor system may comprise an inertial measurement unit (IMU), a global navigation satellite system (GNSS) transceiver (e.g., a global positioning system (GPS) transceiver), a radar (RADAR), a laser rangefinder/LIDAR (or other distance measurement devices), an acoustic sensor, an ultrasonic sensor and a camera or an image capture device. The sensor system may comprise a plurality of sensors (e.g., oxygen ($O_2$) monitors, fuel gauge sensors, engine oil pressure sensors, temperature sensors, humidity sensors, and pressure sensors) for monitoring the vehicle 100. Other sensors may also be configured. One or more sensors comprised in the sensor system can be driven independently or collectively to update the position, orientation, or both of the one or more sensors.

The IMU may comprise a combination of sensors (e.g., an accelerometer and a gyroscope) for sensing position and direction changes of the vehicle 100 based on inertial acceleration. The GPS transceiver may be any sensor for estimating the geographic position of the vehicle 100. For this purpose, the GPS transceiver may comprise a receiver/a transmitter to provide position information of the vehicle 100 relative to the earth. It should be noted that GPS is an example of the global navigation satellite system. Therefore, in some embodiments, the GPS transceiver may be replaced with a BeiDou satellite navigation system transceiver or a Galileo satellite navigation system transceiver. The radar unit may use radio signals to sense an object in the environment in which the vehicle 100 is located. In some embodiments, in addition to sensing the object, the radar unit may also be used to sense the velocity and heading of an object approaching the vehicle 100. The laser rangefinder or LIDAR unit (or other distance measurement devices) may be any sensor that uses laser light to sense an object in the environment in which the vehicle 100 is located. In one embodiment, the laser rangefinder/LIDAR unit may comprise a laser source, a laser scanner, and a detector. The laser rangefinder/LIDAR unit is configured to operate in either a consecutive (e.g., using heterodyne detection) or inconsecutive detection mode. The camera may comprise a device for capturing a plurality of images of the environment in which the vehicle 100 is located. The camera may be a still image camera or a dynamic video camera.

The computing system of the vehicle 100 may comprise at least one processor (which may comprise at least one microprocessor) that executes processing instructions (i.e., machine-executable instructions) stored in a non-volatile computer-readable medium (e.g., a data storage device or a memory). The computing system may also be a plurality of computing devices that distributively control components or systems of the vehicle. In some embodiments, the memory may contain processing instructions (e.g., program logic) that are executed by the processors to implement various functions of the vehicle. In one embodiment, the computing system can be in data communication with the driving system, the sensor system, the control system, the user interface system, and/or the communication system. The interfaces of the computing system are configured to facilitate data communication between the computing system and the driving system, the sensor system, the control system, the user interface system and the communication system.

The memory may also comprise other instructions, e.g., instructions for data transmission, instructions for data reception, instructions for interaction, or instructions for controlling the driving system, the sensor system, the control system or the user interface system. In addition to storing the processing instructions, the memory may store a variety of information or data, e.g., image processing parameters, road maps and path information. These information may be used by the vehicle 100 and the computing system 150 during operation of the vehicle 100 in an autonomous mode, a semi-autonomous mode and/or a manual mode.

In some embodiments, some or all of the functions of the autonomous driving control may be achieved by the computing system of the vehicle 100. For example, some or all of the functions may be achieved using program code instructions residing in one or more memories (or data storage devices) and executed by one or more processors. The computing system may control the functions of the vehicle 100 based on inputs received from various vehicle systems (e.g., the driving system, the sensor system and the control system) or inputs received from the user interface system. For example, the computing system can use inputs from the control system to control a steering unit to avoid obstacles detected by the sensor system. In an embodiment, the computing system may be configured to control various aspects of the vehicle 100 and a system thereof.

In other embodiments, the vehicle 100 comprises an independent autonomous driving control unit, which is implemented, for example, at least partly using various application-specific circuit logics, various processors, various field programmable gate arrays ("FPGAs"), various application-specific integrated circuits ("ASICs"), various real-time controllers and hardware.

A sensor holder 110 is fixedly installed above a cab of the vehicle 100. It is not limited that the sensor holder 110 should be installed above the cab, and it may instead be installed on two sides of the cab, above the engine cover, at the front bumper, and at other positions that are convenient for data acquisition. The number of the sensor holders 110 is not limited to one, and a plurality of sensor holders may also be fixedly installed at different positions of the vehicle 100. A plurality of sensors (e.g., a fixedly installed camera 111 and an inertial measurement unit 112) of the sensor system are arranged on the sensor holder. The camera 111 and the inertial measurement unit 112 may be installed at the same position or at different positions on the sensor holder. Preferably, the camera 111 and the inertial measurement unit 112 are, for example, stacked on the sensor 110 to enable the pose of the camera 111 to substantially coincide with the pose of the inertial measurement unit 112, so that the pose parameters of the camera 111 can be obtained based on the state variables of the inertial measurement unit 112 in the fused pose optimization. A GPS receiver is provided in the cab for estimating the position information of the vehicle 110 and roughly estimating the camera pose based on the position information.

In the embodiments described above, it is described that the vehicle 100 comprises various components (or units), and one or more of the components (or units) may be loaded on the vehicle 100 or separately associated with the vehicle 100. For example, the computing system may exist partially or wholly independent of the vehicle 100. Thus, the vehicle 100 can exist in the form of separate or integrated equipment units. The equipment units constituting the vehicle 100 can communicate with each other in a wired or wireless communication mode. In some embodiments, additional components or units may be added to various systems, or one or more of the components or units may be removed from the systems.

Figure 2:
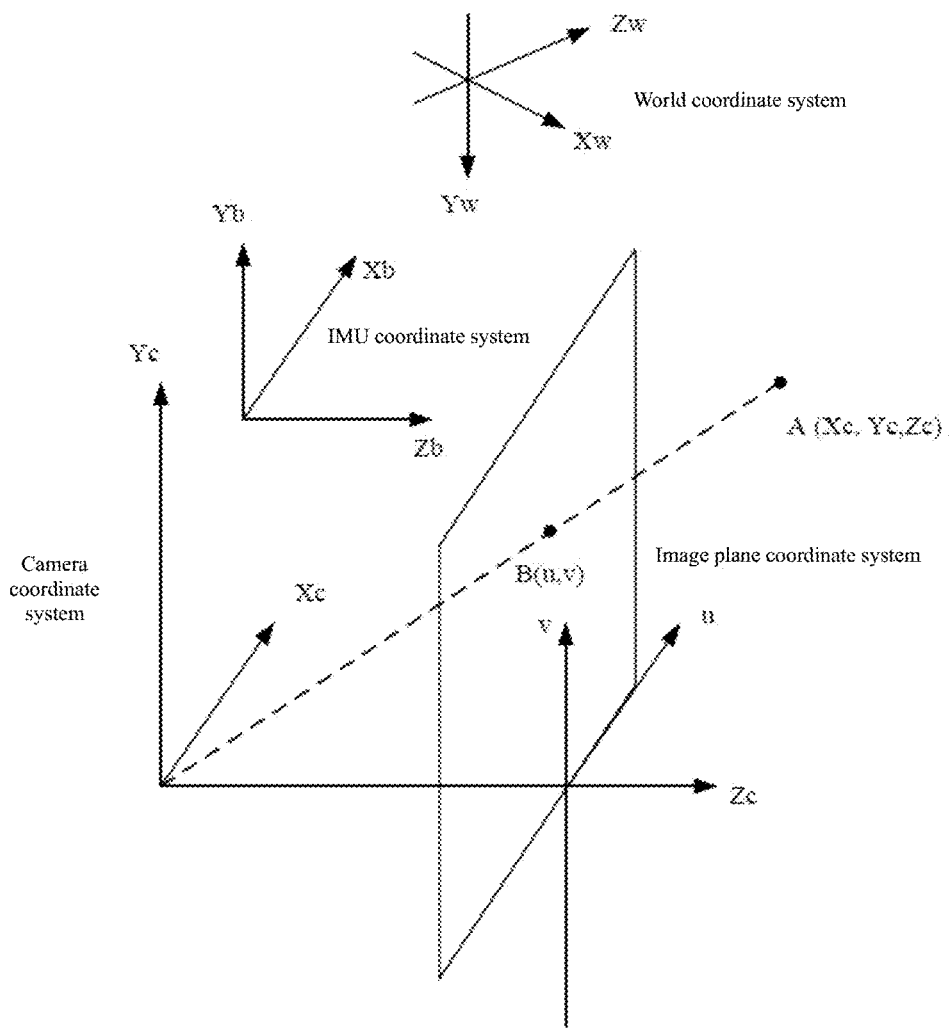
FIG. 2 shows a schematic diagram of the relationship between a world coordinate system, an image coordinate system and an image plane coordinate system.

FIG. 2 shows a schematic diagram of the relationship between a world coordinate system, an IMU coordinate system, a camera coordinate system, and an image plane coordinate system. The pose estimation method described below involves coordinate transformation of a plurality of coordinate systems.

In the application scene of autonomous driving, the camera is installed on a sensor holder of the vehicle, and the position of the camera changes along with the vehicle in the moving process of the vehicle, as shown in FIG. 1. The world coordinate system is an absolute coordinate system, the camera coordinate system is a coordinate system with the camera position as an origin, and the IMU coordinate system is a coordinate system with the position of the inertial measurement unit as an origin. The 3D coordinates of objects located in the environment may all be represented using the world coordinate system, the camera coordinate system and the IMU coordinate system.

The 3D coordinates $p_w$ of the objects in the world coordinate system can be transformed to the 3D coordinates $p_b$ of the IMU coordinate system using a rotation matrix $R_w^b$ and a translation vector $p_w^b$ as shown in equation (1).

$$p_b = R_w^b * p_w + p_w^b \tag{1}$$

The 3D coordinates $p_b$ of the objects in the IMU coordinate system may be transformed to the 3D coordinates $p_c$ of the camera coordinate system using a rotation matrix $R_b^c$ and a translation vector $p_b^c$, as shown in equation (2).

$$p_c = R_b^c * p_b + p_b^c \tag{2}$$

The image plane coordinate system is a two-dimensional coordinate system of an image plane shot by the camera. Any object located in the environment is imaged on the image plane via the camera, which projects the 3D coordinates into 2D coordinates. The origin O of the camera coordinate system is on the same axis (Z-axis) as the origin O' of the imaging plane coordinate system, and OO' is the focal length of the camera. The 3D coordinates $p_c$ of any object in the camera coordinate system can be transformed to the 2D coordinates $p_{uv}$ of the image plane coordinate system using the camera internal reference K, as shown in equation (3).

$$p_{uv} = K * p_c \tag{3}$$

wherein the camera internal parameter K is a characteristic parameter of the camera, and is determined when the camera leaves a factory.

In the embodiments of the present disclosure, the feature points of the semantic features of the semantic map are represented as 3D coordinates in the world coordinate system, subjected to two coordinate transformations and then projected to the image plane of the camera image to calculate registration errors. The first coordinate transformation is performed from the world coordinate system to the IMU coordinate system, and the second coordinate transformation is performed from the IMU coordinate system to the camera coordinate system. Therefore, the coordinate transformation method obtains a normalized camera coordinate system, which not only comprises the pose change of the camera, but also comprises the pose change of the inertial measurement unit, thereby allowing the fusion optimization of the visual observation model and the motion model.

Figure 3:
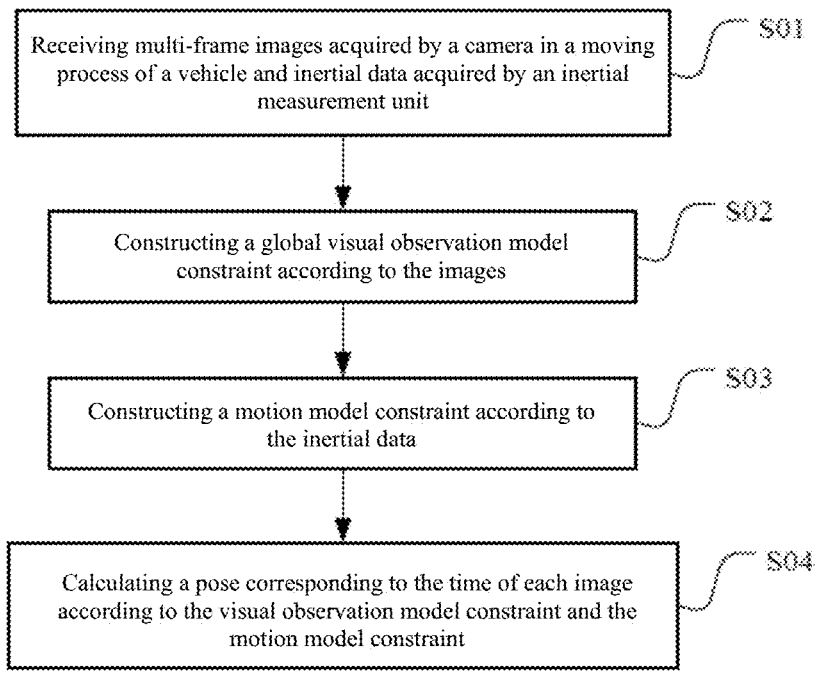
FIG. 3 shows a flowchart of a pose estimation method according to a first embodiment of the present disclosure.

FIG. 3 shows a flowchart of a pose estimation method according to a first embodiment of the present disclosure. Referring to FIG. 1, a camera and an inertial measurement unit are fixedly installed on the sensor holder of an object (e.g., a vehicle), and the pose estimation method is used to estimate the camera pose corresponding to the time of each image frame in the moving process of the object (e.g., the vehicle). It should be understood that the vehicle is taken as an example below, but in fact, the vehicle may be any object, such as any movable equipment, comprising but not limited to a car, a truck, a motorcycle, a bus, a watercraft, an aircraft, a helicopter, a lawn mower, an excavator, a snowmobile, an aircraft, a recreational vehicle, an amusement park vehicle, farming equipment, construction equipment, a tramcar, a golf cart, a train, a trolleybus, or other vehicles.

In step S01, multi-frame images acquired by the camera and inertial data acquired by the inertial measurement unit in the moving process of the vehicle are received.

In the moving process of the vehicle, the camera and the inertial measurement unit acquire images and inertial data at respective frame rates, respectively. The inertial data are, for example, the acceleration and rotation angle output by the inertial measurement unit. The acquisition frame rate of the inertial measurement unit is higher than that of the camera, and for example, m image frames and n groups of inertial data are acquired in the same time period, wherein n>m. Thus, multiple sets of inertial data may be obtained between adjacent image frames.

In the pose estimation method provided by the embodiments of the present disclosure, a time sliding window is constructed to process the sensor data of the consecutive frames. The time sliding window, for example, has a fixed time width and comprises a preset number of image frames in the multi-frame images and inertia data between the times of the adjacent images (see FIG. 7). The camera pose estimation result corresponding to each image frame is output in each time sliding window. The time sliding window slides along the time series so that the estimation and update of the total probability density of state variables can be maintained recursively.

In step S02, a global visual observation model constraint is constructed according to the images. The global visual observation model constraint is used to characterize the registration errors of the features between the images and the map.

Here, the map is only required to provide the spatial position information of points, such as a point cloud map and a semantic map, and the present disclosure does not specifically limit the type of the map. Generally, the semantic map that provides semantic features may be pre-established. For autonomous driving, semantic information refers to those multi-level and multidimensional information which can enable an unmanned vehicle to better understand driving rules, perceive road traffic conditions and plan traveling routes and is encompassed in a high-precision map. Semantic features are target features detected and identified out in the map. Many different objects and concepts such as lane lines, signs, street light poles, traffic lights, cars, isolation belts, roadside trees and blue sky are marked on the high-precision map to form a semantic map.

As known in the art, the establishment of the semantic map, for example, comprises data acquisition and data processing. The data acquisition of the scene is carried out by an acquisition vehicle loaded with a high-precision global positioning system, an inertial measurement unit and a laser radar. The acquired data are pre-processed and fused with the inertial data of the inertial measurement unit and the point cloud inter-frame registration results of the laser radar for the global pose image optimization, so as to generate a globally consistent point cloud map. The semantic features of the point cloud map are extracted, and the corresponding semantic elements such as lane lines (including solid lines and dashed lines), traffic lights and light poles are extracted from the point cloud map. Finally, the point clouds of these semantic elements are semantically marked and parameterized into the corresponding semantic map with reference to their 3D coordinates. The semantic map takes the east-north-up (ENU) coordinate system as a reference system. The establishment of the semantic map is merely illustrated by examples in the present application without posing any restriction on this.

Further, the images acquired by the camera are pre-processed, the semantic features and dynamic targets in the images are extracted and the semantic features in the images are vectorized.

In the application scene of autonomous driving, lane lines are a consecutive feature of a road, and a consecutive pose estimation result is obtained based on the lane line constraint. In this embodiment, solid lane lines and dashed lane lines serve as preferred semantic features. However, the present disclosure is not limited to this. In the global visual observation model constraint, arbitrary image features can be adopted, comprising not only semantic features, but also non-semantic features (these non-semantic features can provide corresponding descriptors). Semantic features comprise at least one of lane lines or signs, wherein the lane lines comprise at least one of dashed lane lines or solid lane lines, and signs comprise, but are not limited to, street light poles, traffic lights, trash cans, billboards, telephone poles, or the like. The non-semantic features comprise, but not limited to, geometric features, spatial relationship features, shape features, or the like.

The mask of the dynamic target is used for subsequent data association with the semantic map and for the removal of anomalies/outliers. For example, after semantic feature points are selected on the semantic map, if the projection point of a certain point on the image is blocked by the dynamic target, the corresponding semantic feature point is removed.

Further, the registration errors of the semantic features between the camera images and the semantic map within the time sliding window are calculated. For example, the registration errors of the solid lane lines and the registration errors of the dashed lane lines are calculated in this step respectively. To be specific, the projection features of features of the map and the corresponding real features of features of the map can be both determined in the image, and the registration errors are calculated according to the projection features and the real features. For example, for a feature point A in the map, the point A is projected to the image to get a projection point B, and a real point C is determined in the map corresponding to point A in the map. Then the registration error of point B and point C is calculated. The projection features are, for example, the projection points of the dashed lane line points or solid lane line points, and the corresponding real features can be the identified dashed lane line points or the identified solid lane lines. At this time, each corner point of each dashed lane line in the map and the images can be determined, then the corner points in the map are projected into the images, the projection points are matched with the corner point true values determined in the images, and the corresponding registration errors are calculated. It should be understood that the features of the map can be projected into the images to obtain projection points, or the features of the images can be projected into the map, which is not limited by the present disclosure.

Based on this, the global visual observation model constraint may be constructed according to the registration errors of the features between the map and a preset number of image frames within the time sliding window, and the preset number of frames may be all or part of the frames of the time sliding window, which is not limited by the present disclosure.

In the semantic map, the solid lane lines, which are consecutive lines, are cut off to obtain a plurality of pixel points p for solid lane line sampling, the pixel points p are subjected to a coordinate transformation and projected from the world coordinate system into camera images, and the distances between the pixel points and the nearest solid lane line in the camera images are calculated as registration errors, so as to obtain the solid lane line projection factor $r_{c_s}(Z_i, X_k)$, as shown in equation (4):

$$r_{c_s}(Z_i, X_k) = \text{dist}(\text{project}(R_b^{c*}(\tilde{R}_k^*(R_w^{b_k}*p_{i_w}+p_w^{b_k})+\tilde{p}_k)+p_b^{c}), \text{dist\_img}) \quad (4)$$

wherein p_(i_w) represents coordinates, in the world coordinate system, of an ith sample of the sampled solid lane line feature points of the map; R_wˆ(b_k) and p_wˆ(b_k) represent a rotation matrix and a translation vector from the world coordinate system to the IMU coordinate system at time k, respectively; R_bˆc and p_bˆc represent a rotation matrix and a translation vector from the IMU coordinate system to the camera coordinate system, respectively, which are also described as IMU-camera external parameters; R~_k and p~_k represent a rotation matrix and a translation vector of the jitter of the sensor holder, respectively; the function project (·) is a pinhole camera projection model, which is used to project the feature points from the camera coordinate system to the image planes of the images; the function dist_img represents the distance function of the solid lane lines; and the function dist (p, dist_img) represents the distances from the pixel points p to the nearest solid lane line. It should be understood that time k may be an image acquisition time, i.e., an acquisition time of a kth image frame.

The above-described function dist_img represents digital images generated based on camera image transformation (see G. J. C. V. G. Borgefors and I. Processing, "Distance transformations in digital images", vol. 34, 1986). The function dist_img is obtained in the following ways: in a camera image, the pixel values of the positions where the solid lane lines are located are set to 0, and the pixel values of other positions are set to 1, thereby obtaining a semantic image seg_mg about the solid lane lines; and the semantic image seg_mg is subjected to a distance transformation, thereby obtaining the function dist_img, wherein each pixel value represents the pixel distance from the pixel at the corresponding position in the seg_img to the nearest zero pixel of the current image (seg_img).

In a semantic map, the dashed lane lines are sampled in the form of a plurality of pixel points p (e.g., 4 corner points are sampled), the pixel points p are subjected to a coordinate transformation and projected from the world coordinate system into camera images, and the distances between the pixel points and the corresponding pixel points in the camera images are calculated as registration errors, thereby obtaining the dashed lane line projection factor $r_{c_d}(Z_i, X_k)$, as shown in equation (5):

$$r_{c_d}(Z_i, X_k) = \text{project}(R_b^{c*}(\tilde{R}_k^*(R_w^{b_k}*p_{i_w}+p_w^{b_k})+\tilde{p}_k)+p_b^{c})-p_{i\_uv} \quad (5)$$

wherein $p_{i\_uv}$ represents pixel coordinates of an $i^{th}$ sample in the dashed lane line feature points that are sampled in the camera pixels; $p_{i_w}$ represents coordinates, in the world coordinate system, of the $i^{th}$ sample in the dashed lane line feature points that are sampled in the map; $R_w^{b_k}$ and $p_w^{b_k}$ represent a rotation matrix and a translation vector from the world coordinate system to the IMU coordinate system at time k, respectively; $R_b^c$ and $p_b^c$ represent a rotation matrix and a translation vector from the IMU coordinate system to the camera coordinate system, respectively; $\tilde{R}_k$ and $\tilde{p}_k$ represent a rotation matrix and a translation vector of the jitter of the sensor holder, respectively; and the function project(·) is a pinhole camera projection model, which is used to project the feature points from the camera coordinate system to the image planes of the images.

In the global visual observation model constraint described above, the sampled feature points of both the solid lane lines and the dashed lane lines are subjected to two coordinate transformations, and then are projected to the image planes of the camera images to calculate the registration errors. The first coordinate transformation is performed from the world coordinate system to the IMU coordinate system, and the second coordinate transformation is performed from the IMU coordinate system to the camera coordinate system. Therefore, the global visual observation model constraint described above adopts a normalized camera coordinate system, which not only comprises the pose change of the camera, but also comprises the pose change of the inertial measurement unit. Since the global visual observation model constraint adopts the normalized camera coordinate system, the solid lane line projection factors and the dashed lane line projection factors of the global visual observation model constraint can be subjected to fusion optimization together with the IMU pre-integration factors in the motion model constraint below.

In step S03, the motion model constraint is constructed according to the inertial data. The motion model constraint is used to characterize the residual error of the pre-integration amount of the inertial measurement unit.

As discussed above, the time sliding window comprises a preset number of image frames in the multi-frame images and inertia data between the times of the adjacent images. The step S03 may specifically comprise: constructing a motion model constraint according to the inertial data within the time sliding window, i.e., the inertial data acquired during a period of time when the preset number of images are captured. Here, the motion model constraint comprises a motion constraint to which the inertial data should conform, and specifically comprises at least one of the followings: a pre-integration factor constraint between consecutive image frames of the inertial data, an input noise constraint of the inertial data or a measurement value deviation constraint of the inertial data. For example, the input noise of the original IMU conforms to the Gaussian white noise distribution, and the measurement value deviation of the original IMU conforms to the random walk. Of course, those skilled in the art may also set other constraint conditions as needed, which is not limited in the present disclosure.

In this step, the inertial data acquired by the inertial measurement unit is pre-processed, and the inertial data for example are accelerations and angular velocity comprising bias and noise. A group of inertial data between adjacent image frames are propagated using a numerical integration (e.g., median or Euler integration) method, and the set of inertial data are processed by a pre-integration method to obtain the pre-integration amounts (representing a change amount Δp of a displacement, a change amount Δv of a velocity, and a change amount Δq of a rotation, respectively) independent of an absolute pose.

The pre-integration factor may be calculated according to the following method: processing the inertial data to obtain a pre-integration amount of a state variable of the inertial measurement unit at the time of the current image; and calculating the residual error of the state variable as the pre-integration factor according to the pre-integration amount and the state variable of the inertial measurement unit at the time of the previous image.

Further, the error (i.e., the residual error) between the actual observed value and the estimated value of a pre-integration amount of the inertial measurement unit within the time sliding window is calculated, so as to obtain a pre-integration factor $r_B(Z_{B_{k+1}}^{B_k}, X_k)$, as shown in equation (6):

$$r_B(Z_{B_{k+1}}^{B_k}, X_k) = \begin{bmatrix} R_w^{b_k}(p_{b_{k+1}}^w - p_{b_k}^w - v_{b_k}^w \Delta t - \frac{1}{2} g \Delta t^2) - \Delta p \\ R_w^{b_k}(v_{b_{k+1}}^w - v_{b_k}^w - v_{b_k}^w - g\Delta t^2) - \Delta v \\ 2[\Delta q^{-1} \otimes q_{b_k}^{w-1} \otimes q_{b_{k+1}}^w]_{xyz} \\ b_{a_{k+1}} - b_{a_k} \\ b_{g_{k+1}} - b_{g_k} \end{bmatrix} \quad (6)$$

wherein Δp represents a change amount of a displacement, Δv represents a change amount of a velocity, and Δq represents a change amount of a rotation; $R_w^{b_k}$ represents a rotation matrix from the world coordinate system to the IMU coordinate system at time k; $p_{b_k}^w$ represents a translation vector from the camera coordinate system to the world coordinate system at time k; $p_{b_{k+1}}^w$ represents a translation vector from the camera coordinate system to the world coordinate system at time k+1; $v_{b_k}^w$ represents a velocity vector from the camera coordinate system to the world coordinate system at time k; $v_{b_{k+1}}^w$ represents a velocity vector from the camera coordinate system to the world coordinate system at time k+1; $q_{b_k}^w$ represents a rotation angle from the camera coordinate system to the world coordinate system at time k; $q_{b_{k+1}}^w$ represents a rotation angle from the camera coordinate system to the world coordinate system at time k+1; Δt represents a time between a previous image frame to a current inertial acquisition frame; g represents a gravity vector; $b_{a_k}$ represents an accelerometer bias at time k; $b_{a_{k+1}}$ represents an accelerometer bias at time k+1; $b_{g_k}$ represents a gyroscope bias at time k; and $b_{g_{k+1}}$ represents a gyroscope bias at time k+1.

In step S04, the poses of the camera, the inertial measurement unit or the object that corresponds to the times of the images are calculated according to the visual observation model constraint and the motion model constraint.

In the present disclosure, based on the various constraints, the optimization state when the various constraint conditions are met is calculated. Those skilled in the art can select a calculation method for solving the state variables based on the constraint conditions as needed at will, which is not limited in the present disclosure. For example, the objective optimization method is adopted, and preferably the least squares solution is adopted. Various constraint conditions are subjected to direct summation or weighted summation and the least squares solution is carried out.

In this step, the expression of the state variable of the inertial measurement unit is constructed according to the visual observation model constraint and the motion model constraint, as shown in equation (7).

$$X^* = \underset{X}{\operatorname{argmin}} \|r_p(X)\|^2 + \sum_{k \in B} \left\| r_B(Z_{B_{k+1}}^{B_k}, X_k) \right\|_{\Sigma_{B_k}} + \sum_{k \in B} \left( \sum_{i \in C_d} \left\| r_{C_d}(Z_i, X_k) \right\|_{\Sigma_d} + \sum_{i \in C_s} \left\| r_{C_s}(Z_i, X_k) \right\|_{\Sigma_s} \right) \quad (7)$$

wherein X* represents the state variable; argmin represents a variable set when a posterior probability takes a minimum value; $r_p(X)$ represents a priori item of marginalization at a previous time; $r_B(Z_{B_{k+1}}^{B_k}, X)$ represents the pre-integration factor of the inertia measurement unit, i.e., the residual error of a predicted value of the state variable of the inertia measurement unit; $r_{C_s}(Z_i, X_k)$ represents a solid lane line projection factor, i.e., a residual error of a visual solid lane line constraint in the time sliding window at time k; $Z_i$ in the solid line projection factor represents visual observation of a sampling point of an $i^{th}$ lane line (i.e., an $i^{th}$ sample in the sampled solid lane line points), and the $Z_i$ can also be marked as $Z_{id}^{global}$. $r_{C_d}(Z_i, X_k)$ represents a dashed lane line projection factor (i.e., a geometric residual error of a visual dashed lane line endpoint constraint at time, in the time sliding window); $Z_i$ in the dashed line projection factor represents visual observation of an $i^{th}$ dashed lane line point (i.e., an $i^{th}$ sample in the sampled dashed lane line point); and the $Z_i$ can also be marked as $Z_{is}^{global}$. $\Sigma_d$ and $\Sigma_s$ represent observed covariances of solid lane line points and dashed lane line points, respectively; and $\Sigma_{B_k}$ represents a covariance of pre-integration.

Further, the expression is subjected to the least squares solution to obtain the state variable of the inertial measurement unit. The state variable of the inertial measurement unit comprises at least one of the followings: displacement, velocity, direction, gyroscope bias or jitter factor of the inertial measurement unit.

The state variable may also comprise the jitter factor of a camera, such as the jitter factor of the camera holder. At time k, the state variable comprises $X_k = [p_{b_k}^w \ v_{b_k}^w \ q_{b_k}^w \ b_{a_k} \ b_{g_k} \ \tilde{p}_{b_k}^b \ \tilde{q}_{b_k}^b]$, which represent the displacement, velocity and direction of the IMU, the biases of the accelerometer and the gyroscope, the jitter of the IMU and the jitter of the camera holder, respectively. Specifically, the pose of the IMU at time k is $T_{b_k}^w = [p_{b_k}^w, q_{b_k}^w]$; $\tilde{T}_{b_k}^b = [\tilde{p}_{b_k}^b, \tilde{q}_{b_k}^b]$ represents the jitter of the camera holder and the IMU; and $v_{b_k}^w$, $b_{a_k}$, $b_{g_k}$ represent the deviation and velocity of the IMU, respectively. For the pose of the camera $T_{c_k}^{enu} = T_{b_k}^{enu} * \tilde{T}_{b_k}^b * T_c^b$, $T_{b_k}^{enu}$ represents a pose from the IMU to the ENU, and $T_c^b = [p_c^b, q_c^b]$ represents an external parameter from the camera to the IMU. Therefore, if the state variable of the IMU and the preset coordinate transformation relationship are known, the poses of the IMU, the camera and the vehicle can be determined.

The state variable calculated by the present disclosure comprises the state variable of the inertial measurement unit at the time of each image (i.e., each image frame) within the time sliding window. Within the time sliding window, according to the visual observation model constraint and the motion model constraint, not only the state variable at the time of the current image (i.e., the current image frame) can be obtained, but also the state variable at the time of the previous image (i.e., the previous image frame) within the time sliding window can be updated.

Figure 7:
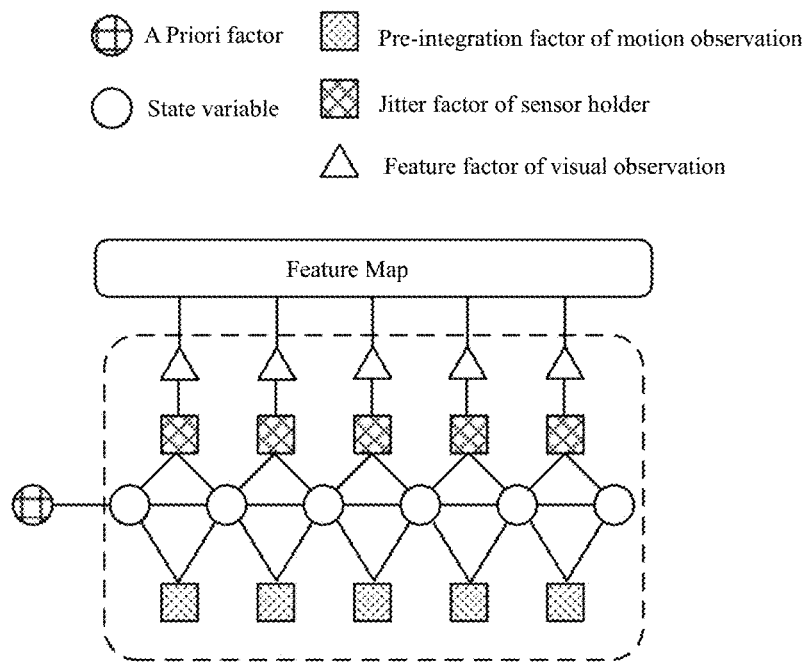
FIG. 7 shows a schematic diagram of the principle of a time sliding window algorithm adopted in the pose estimation method.

According to one embodiment, referring to FIG. 7, the dashed line box represents a sliding window which has a plurality of state variables to be optimized therein, each state variable corresponds to an image frame, the a priori item of the state variables is known, each image frame has the state variable to be optimized, and the pre-integration amount of the IMU is provided between the adjacent images for constructing a motion model constraint. In addition, visual feature factors between the semantic map and the images and the jitter factor of the sensor holder are used for constructing a visual observation model constraint. A series of sensor inputs, historical observations Z and states $X_k$ are given, and on the basis of the two observation model constraints, by constructing a Bayesian network model, the posterior probabilities $P(X|U, Z) \propto P(X_0)\Pi_{k=1}^{m}P(X_k|X_{k-1}, U_k)\Pi_{k=1}^{m}\Pi_{l=1}^{L}P(Z_{kl}|X_k)$ of the state variables can be calculated, wherein k represents a $k^{th}$ image frame, l represents an $l^{th}$ sensor (such as a camera), L represents a total number of sensors, and $P(X_0)$, $P(X_k|X_{k-1}, U_k)$, $P(Z_{kl}|X_k)$ represent an a priori probability of the state variable, a conditional probability of the timing motion model, and a posterior probability of the global observation model, respectively.

Generally, after the state variable of each current image frame is calculated, the estimated state variable of the next image frame can be calculated according to the pre-integration amount of the state variable between the adjacent image frames that is obtained by the priori knowledge. For example, the estimated state variable is obtained by adding the state variable of the current image frame to the pre-integration amount of the state variable of the adjacent image frame. If there are m image frames within the time sliding window and the next image frame is the $m^{th}$ image frame, according to the existing state variables of the previous m−1 image frames, the estimated state variable of the $m^{th}$ image frame and the visual observation model constraint and motion model constraint that are associated with the m image frames, through joint optimization, the optimized state variable of the next image frame can be obtained, and the state variables of the previous m−1 images are updated again.

Further, step S04 may comprise: obtaining the state variable of the inertial measurement unit according to the visual observation model constraint and the motion model constraint; and calculating the pose of the camera, the inertial measurement unit or the object that corresponds to the time of each image frame according to the state variable of the inertial measurement unit. Specifically, the pose of the inertial measurement unit is calculated according to the state variable of the inertial measurement unit, and the pose of the camera is calculated according to the coordinate transformation relationship between the inertial measurement unit and the camera. Calculating the pose based on the state variable of the object is known in the art and the present application does not have any limitation to this.

In the pose estimation method according to the first embodiment of the present disclosure, the pose is estimated using a fusion model of the global visual observation model constraint and the motion model constraint. Since the inertial data acquired by the inertial measurement unit are generally not influenced by environmental changes, the pose estimation method can provide consecutive pose estimation results when the environment changes. Since the acquisition frame rate of the inertial measurement unit is higher than that of the camera, the pose estimation method can improve the real-time performance of pose estimation. Since there is a complex scene in a moving process of an object, the position information of the global positioning system may be temporarily lost due to the shielding by tunnels and tall buildings, or semantic features may be temporarily lost due to the shielding by an obstacle or severe weather. The pose estimation method is based on a fusion model of the visual observation model constraint and the motion model constraint, and can acquire consecutive and reliable pose estimation results in the complex scene, so that the accuracy, real-time performance, stability and robustness of pose estimation in the complex scene can be improved.

Figure 4:
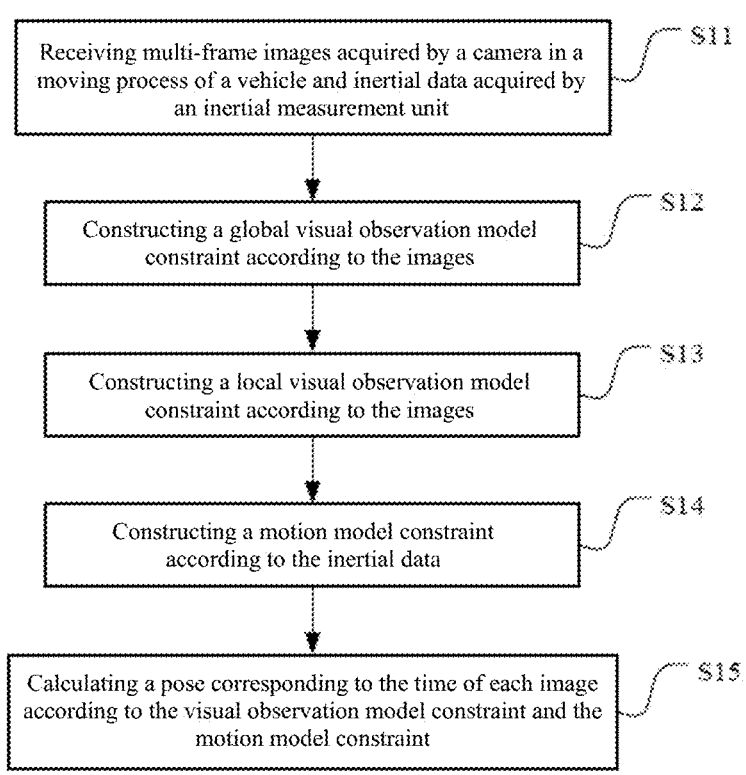
FIG. 4 shows a flowchart of a pose estimation method according to a second embodiment of the present disclosure.

FIG. 4 shows a flowchart of a pose estimation method according to a second embodiment of the present disclosure. Compared with the first embodiment, the pose estimation method according to the second embodiment further comprises an additional local visual observation model constraint, which can further accelerate the convergence of fusion optimization.

In step S11, the multi-frame images acquired by the camera and the inertial data acquired by the inertial measurement unit in the moving process of the vehicle are received. This step can be similar to step S01 shown in FIG. 3, and thus is not detailed here again.

In step S12, a global visual observation model constraint is constructed according to the images. This step can be similar to step S02 shown in FIG. 3, and thus is not detailed here again.

In step S13, a local visual observation model constraint is constructed according to the images.

In this step, the images acquired by the camera are pre-processed, the semantic features and the dynamic targets in the images are extracted, and the semantic features in the images are vectorized.

In the local visual observation model constraint, arbitrary image features can be adopted, comprising but not limited to semantic features, geometric features, color features, texture features, spatial relationship features, shape features or the like. The semantic features comprise at least one of lane lines or signs, wherein the lane lines comprise at least one of dashed lane lines or solid lane lines, and the signs comprise but are not limited to street light poles, traffic lights, trash cans, billboards, telephone poles, or the like.

The mask of the dynamic target is used for subsequent data association with the semantic map and for the removal of anomalies/outliers. For example, after semantic feature points are selected on the semantic map, if the projection point of a certain point on the image is blocked by the dynamic target, the corresponding semantic feature point is removed.

Further, the local visual observation model constraint is constructed according to the registration errors of features between a preset number of image frames within the time sliding window, and the preset number of frames may comprise adjacent image frames within the sliding window, or partially spaced image frames, which is not limited in the present application. For example, the registration errors of the features between the adjacent camera images within the time sliding window are calculated. For example, the registration errors of the lane line semantic features are calculated in this step.

In the camera images, the image features are sampled to obtain a plurality of pixel points p. Then, the pixel points p are subjected to a coordinate transformation from the camera coordinate system at time k−1 to the camera coordinate system at time k and are projected (i.e., re-projected) into the camera images, and the distances between the pixel points and the corresponding pixel points in the camera images are calculated as registration errors, thereby obtaining the feature projection factors $r_{c_{kp}}$ $(Z_i, X_{k-1}, X_k)$ of local observation, as shown in equation (8):

$$r_{c_{kp}}(Z_i, X_{k-1}, X_k) = \text{project}(R_{c_{k-1}}^{c_k} \cdot p_{kpi} + p_{c_{k-1}}^{c_k}) - p_{i\_uv} \quad (8)$$

wherein $p_{kpi}$ represents 3D coordinates of an $i^{th}$ feature point in the camera coordinate system at time k−1; $R_{c_{k-1}}^{c_k}$, and $p_{c_{k-1}}^{c_k}$ represent a relative rotation matrix and a relative translation vector from a camera pose at time k−1 to a camera pose at time k, respectively; $p_{i\_uv}$ represents pixel coordinates of an $i^{th}$ feature point in the camera pixel; and the function project(·) is a pinhole camera projection model, which is configured to project the feature points from the camera coordinate system to the image planes of the images.

In step S14, a motion model constraint is constructed according to the inertial data. This step can be similar to step S03 shown in FIG. 3, and thus is not detailed here.

In step S15, the poses of the camera, the inertial measurement unit or the object at the times of the images are calculated according to the visual observation model constraint and the motion model constraint.

In this step, the expression of the state variable of the inertial measurement unit is constructed according to the visual observation model constraint and the motion model constraint, as shown in equation (9).

$$X^* = \underset{X}{\arg\min} \|r_p(X)\|^2 + \sum_{k \in B} \left\|r_B\left(Z_{B_{k+1}}^{B_k}, X_k\right)\right\|_{\Sigma_{B_k}} + \sum_{k \in B}\left(\sum_{i \in C_d}\|r_{C_d}(Z_i, X_k)\|_{\Sigma_d} + \sum_{i \in C_s}\|r_{C_s}(Z_i, X_k)\|_{\Sigma_s}\right) + \sum_{k \in B}\left(\sum_{i \in C_{kp}}\|r_{C_{kp}}(Z_i, X_{k-1}, X_k)\|_{\Sigma_{kp}}\right) \quad (9)$$

wherein $X^*$ represents the state variable; argmin represents a variable set when a posterior probability takes a minimum value; $r_p(X)$ represents an a priori item of marginalization at a previous time; $r_B$ $(Z_{B_{k+1}}^{B_k}, X)$ represents the pre-integration factor of the inertia measurement unit, i.e., the residual error of a predicted value of the state variable of the inertia measurement unit. $r_{c_{kp}}$ $(Z_i, X_{k-1}, X_k)$ represents a feature projection factor of local observation, i.e., a residual error of the local visual observation model constraint at time k within the time sliding window; $Z_i$ in the feature projection factor represents visual observation of an $i^{th}$ feature sampling point; and the $Z_i$ can also be marked as $Z_i^{local}$. $r_{c_s}$ $(Z_i, X_k)$ represents a solid lane line projection factor of global observation, i.e., a residual error of the visual solid lane line constraint at time k within the time sliding window; and $Z_i$ in the solid line projection factor represents visual observation of an $i^{th}$ lane line sampling point. $r_{c_d}$ $(Z_i, X_k)$ represents a dashed lane line projection factor of global observation, i.e., a geometric residual error of a virtual dashed lane line endpoint constraint in the time sliding window at time k; $Z_i$ in the dashed line projection factor represents visual observation of an $i^{th}$ lane line dashed line point; and $\Sigma_{kp}$ represents observed covariances of the consecutive frame feature point constraint. $\Sigma_d$ and $\Sigma_s$ represent observed covariances of solid lane line points and dashed lane line points, respectively; and $\Sigma_{B_k}$ represents a covariance of pre-integration.

Further, the expression is subjected to the least squares solution to obtain the state variable of the inertial measurement unit. The state variable of the inertial measurement unit comprises at least one of the followings: displacement, velocity, direction, gyroscope bias or jitter factor of the inertial measurement unit, and the jitter factor of the camera (e.g., the jitter factor of the camera holder). Within the time sliding window, not only the state variable of the current image frame may be obtained, but also the state variables of the previous image frames may be updated.

Further, the pose of the inertial measurement unit is calculated according to the state variable of the inertial measurement unit, and the pose of the camera is calculated according to the coordinate transformation relationship between the inertial measurement unit and the camera. Calculating the pose based on the state variable of the object is known in the art and the present application does not have any limitation to this.

In the pose estimation method according to the second embodiment of the present disclosure, the pose is estimated using a fusion model of the global visual observation model constraint, the local visual observation model constraint and the motion model constraint. The pose estimation method is based on a fusion model of the visual observation model constraint and the motion model constraint, can acquire consecutive and reliable pose estimation results in the complex scene, and can further accelerate the convergence of fusion optimization using the additional local visual observation model constraint, so that the accuracy, real-time performance, stability and robustness of pose estimation in the complex scene can be improved.

Figure 5:
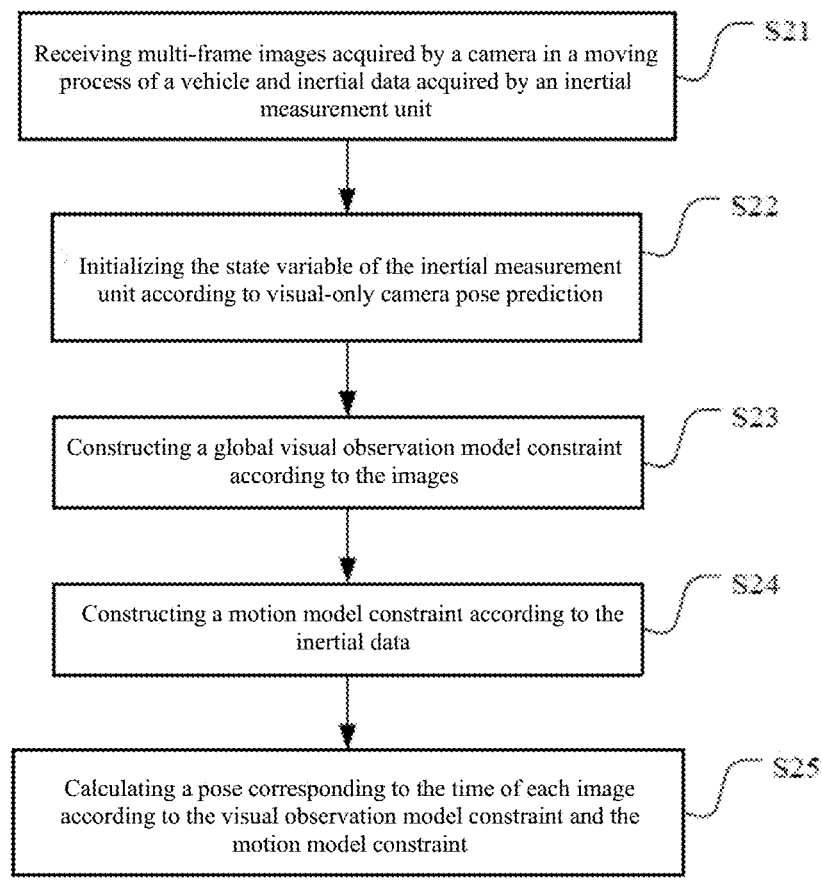
FIG. 5 shows a flowchart of a pose estimation method according to a third embodiment of the present disclosure.

FIG. 5 shows a flowchart of a pose estimation method according to the third embodiment of the present disclosure. Compared with the first embodiment, the pose estimation method according to the third embodiment further comprises an additional state variable initialization step, which can further accelerate the convergence of fusion optimization.

In step S21, the multi-frame images acquired by the camera and the inertial data acquired by the inertial measurement unit in the moving process of the vehicle are received. This step can be similar to step S01 shown in FIG. 3, and thus is not detailed here again.

In step S22, the state variable of the inertial measurement unit is initialized according to the visual-only camera pose prediction.

Figure 6:
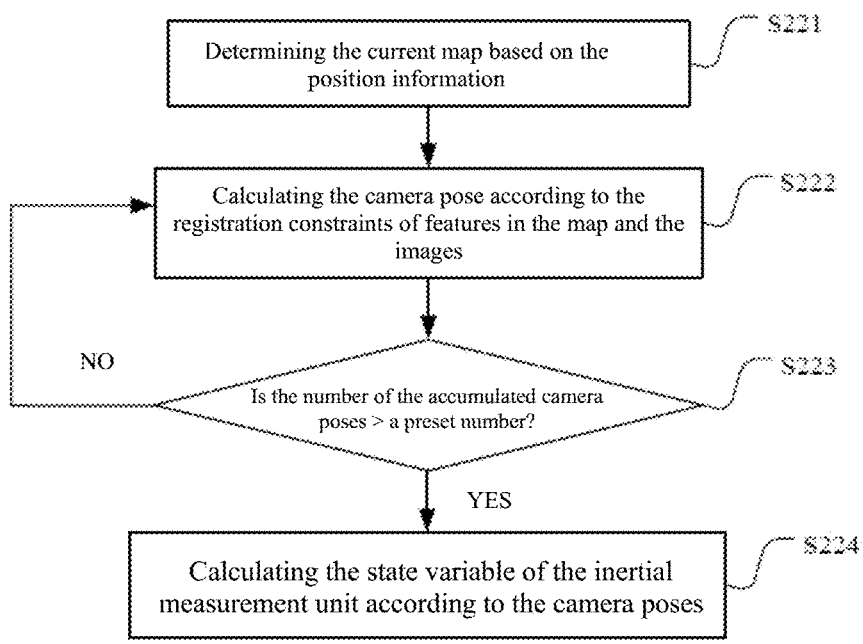
FIG. 6 shows a detailed flowchart of state variable initialization in the pose estimation method shown in FIG. 5.

This step comprises a plurality of sub-steps S221 to S224, as shown in FIG. 6.

In step S221, the current map is determined according to the position information of the global positioning system.

In step S222, the camera poses corresponding to the image frames are calculated according to the registration constraint of features in the map and the images. This step, for example, comprises constructing the expression of the global visual observation model constraint, and carrying out the least squares solution on the expression to obtain the predicted values of the camera poses.

In step S223, it is determined whether the number of the accumulated camera poses of the consecutive frames is greater than a preset number or not. If the number of the accumulated camera poses is greater than the preset number, step S224 is executed. If the number of the accumulated camera poses is equal to or less than the preset number, the process returns to step S222 to acquire the camera pose of the next image frame. The preset number may be the number of frames of the time sliding window, such as 4 frames, but it is certainly not limited to this. i.e., when the camera poses are accumulated enough for a sliding window, the state variables can be initialized.

In step S224, in response to the number of the acquired image frames being larger than or equal to the preset number, the state variable of the inertial measurement unit is calculated according to the camera pose. For example, this step comprises calculating an initialization value of the state variable of the inertial measurement unit, and specifically comprises calculating at least one of the initial gyroscope bias, initial acceleration and initial velocity of the inertial measurement unit according to the camera poses of the plurality of image frames. It can be seen that in the present disclosure, in response to the number of acquired image frames being smaller than the preset number, visual-only camera pose prediction is carried out on the consecutive image frames to obtain the camera pose at the time of each image frame. When the number of the acquired image frames reaches the preset number, an initialization value of the state variable of the inertial measurement unit is calculated so as to implement fused camera pose prediction on the current frame and the subsequent frames according to the inertial measurement unit and the camera. When the initial gyroscope bias of the inertia measurement unit is calculated, the relative poses between the two adjacent images within the time sliding window are calculated, and the initial gyroscope bias is obtained according to the rotation change amount of the relative poses and the angular velocity increment of the inertia data between the adjacent images. Specifically, if the trajectory $T_{c_i}^{enu}$=k−m+1, k−m+2, ..., k−1, k of the camera poses accumulated in the sliding window is known, the relative poses $\Delta T_{c_i}^{c_{i+1}}$ between adjacent camera image frames can be calculated. By using the consistency constraint of the rotation change amount $\Delta q_c$ of $\Delta T_{c_i}^{c_{i+1}}$ and the angular velocity increment $\Delta q$ of the IMU pre-integration between adjacent camera image frames, the consecutive multi-frame constraints are accumulated, the optimization problem is constructed, and the gyroscope bias $b_g$ is solved.

When the initial acceleration of the inertial measurement unit is calculated, the initial acceleration is obtained according to the camera pose trajectory of the multi-frame images within the time sliding window and the displacement increment of inertial data between the adjacent images. Specifically, the constraint is constructed by using the trajectory of the camera poses accumulated in the sliding window and the scale consistency of the displacement increments $\Delta P$ of pre-integration, and the gravity acceleration g is solved.

When the initial velocity of the inertial measurement unit is calculated, the initial velocity is obtained according to the initial gyroscope bias and the initial acceleration. Specifically, after obtaining the gyroscope bias and the initial gravity, the initial velocity may be calculated by the following equation (10), and i=k represents the last frame (i.e., the current frame) of the sliding window:

$$v_i = \begin{cases} \frac{(p_{i+1} - p_i)}{\Delta t_i} - \frac{1}{2}(g + R_i \hat{a}_i)\Delta t & i < k \\ v_{i-1} + g\Delta t + R_{i-1}\hat{a}_{i-1}\Delta t & i = k \end{cases} \quad (10)$$

wherein $v_{i-1}$ and $v_i$ represent velocities of an $(i-1)^{th}$ frame and an $i^{th}$ frame, respectively; $R_i$ and $R_{i-1}$ is a rotation matrix of the $i^{th}$ frame; and $\hat{a}_i$ and $\hat{a}_{i-1}$ are original observed variables of the gyroscope of the $i^{th}$ image frame and the $(i-1)^{th}$ image frame, respectively. It should be understood by those skilled in the art that i in the present disclosure represents an order of the observed samples, and when the observed samples are images, i represents the $i^{th}$ frame; when the observed samples are feature points in the images, i represents the $i^{th}$ feature point, such as the $i^{th}$ solid line sampling points and the $i^{th}$ dashed line sampling points of the images.

In step S23, a global visual observation model constraint is constructed according to the images. This step can be similar to step S02 shown in FIG. 3, and thus is not detailed here again.

In step S24, a motion model constraint is constructed according to the inertial data. This step can be similar to step S03 shown in FIG. 3, and thus is not detailed here.

In step S25, the pose of the camera, the inertial measurement unit or the object that corresponds to the time of each image frame is calculated according to the visual observation model constraint and the motion model constraint. This step can be similar to step S04 shown in FIG. 3, and thus is not detailed here.

In the pose estimation method of the third embodiment of the disclosure, the state variables of the inertial measurement unit are initialized according to the visual-only camera pose prediction, and then the pose is estimated using the fusion model of the global vision observation model constraint and the motion model constraint. Due to the characteristics of the inertial measurement unit, multiple state variables of the inertial measurement unit are coupled together. In this embodiment, in the initialization stage, the inertial data acquired by the inertial measurement unit are not required to be processed, but the camera poses of the multi-frame images need to be accumulated, and the state variables of the inertial measurement unit are calculated according to the camera poses. The initialization of the state variable of the inertial measurement unit can achieve quick decoupling, which can further accelerate the convergence of fusion optimization. The initialization stage depends on the visual-only camera pose prediction and is easily influenced by environmental changes in a complex scene, so the camera poses of multi-frame images need to be accumulated for initialization. In the fusion optimization stage after initialization, consecutive and reliable pose estimation results can be obtained in a complex scene, so that the accuracy, real-time performance, stability and robustness of pose estimation in the complex scene can be improved.

Figure 8:
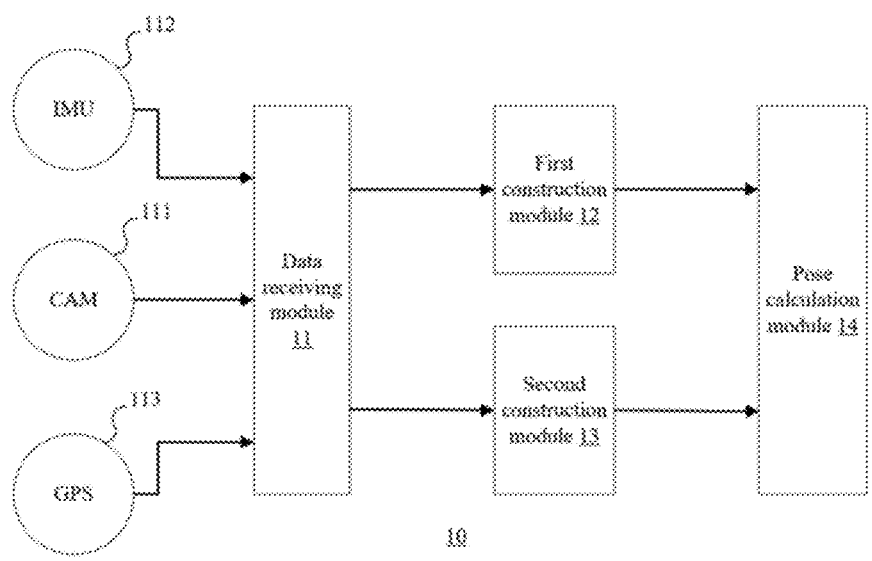
FIG. 8 shows a schematic block diagram of a pose estimation device according to a fourth embodiment of the present disclosure.

FIG. 8 shows a schematic block diagram of a pose estimation device according to the fourth embodiment of the present disclosure. The pose estimation device shown in FIG. 8 is only an example and should not constitute any limitation on the function and use scope of the embodiment of the present disclosure.

The pose estimation device 10, for example, serves as an internal system of the movable equipment for implementing the pose estimation methods of the above embodiments. A plurality of sensors (e.g., a camera 111, an inertial measurement unit 112, and a global positioning system 113) are also fixedly installed on the movable equipment.

The pose estimation device 10 comprises a data receiving module 11, a first construction module 12, a second construction module 13, and a pose calculation module 14. The data receiving module 11 is connected to the plurality of sensors, and is configured to receive the multi-frame images acquired by the camera 111 and the inertial data acquired by the inertial measurement unit 112 in the moving process. The first construction module 12 is connected to the data receiving module 11, and is configured to construct the visual observation model constraint according to the images. For example, the visual observation model constraint comprises at least one of the solid lane line projection factor of global observation, the dashed lane line projection factor of global observation and the feature projection factor of local observation. The second construction module 13 is connected to the data receiving module 11, and is configured to construct a motion model constraint according to the inertial data. For example, the motion model constraint comprises a pre-integration factor of the inertial measurement unit, i.e., the residual error of the state variable predicted value of the inertial measurement unit. The pose calculation module 14 is connected to the first construction module 12 and the second construction module 13, and is configured to construct the expression of the state variable of the inertial measurement unit according to the visual observation model constraint and the motion model constraint, implement the least squares solution on the expression to obtain the state variable of the inertial measurement unit, and further obtain the pose of the camera, the inertial measurement unit or the object that corresponds to the time of each image frame according to the state variable of the inertial measurement unit.

Figure 9:
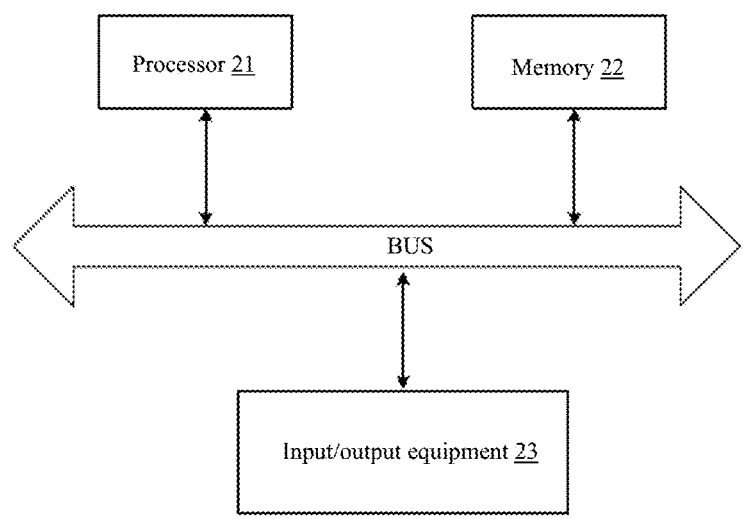
FIG. 9 shows a schematic block diagram of computing equipment according to a fifth embodiment of the present disclosure.

FIG. 9 shows a schematic block diagram of computing equipment according to a fifth embodiment of the present disclosure. The computing equipment illustrated in FIG. 9 is only an example and should not constitute any limitation on the function and use scope of the embodiments of the present disclosure.

The computing equipment 20 comprises a processor 21, a memory 22, and input/output equipment 23 that are connected by a bus. The memory 22 comprises a read only memory (ROM) and a random access memory (RAM), and the memory 22 stores various computer instructions and data required for performing system functions therein, and the processor 21 reads the various computer instructions from the memory 22 to execute various appropriate actions and processes. The input/output equipment 23 comprises an input part such as a keyboard and a mouse; an output part such as a cathode ray tube (CRT), a liquid crystal display (LCD), and a speaker; a storage part such as a hard disk; and a communication part of a network interface card such as a LAN card and a modem. The memory 22 also stores computer instructions to implement the operation associated with the pose estimation method of the embodiments of the present disclosure.

Accordingly, the embodiments of the present disclosure provide computing equipment, comprising a memory and one or more processors in communication with the memory, wherein the memory stores instructions executable by the one or more processors therein, and the instructions are executed by the one or more processors to cause the one or more processors to implement the pose estimation method described above.

Accordingly, the embodiments of the present disclosure provide a computer-readable medium storing a computer program thereon, wherein the computer program is executed by a processor to implement the pose estimation method described above.

The basic principles of the present disclosure are described above with reference to specific embodiments. However, it should be noted that those skilled in the art can understand that all of the methods and the devices or any step or component of the present disclosure can be implemented in any computing device (comprising a processor, a storage medium and the like) or the network of the computing device in the form of hardware firmware, software or a combination thereof. This can be achieved by those skilled in the art using their basic programming skills after reading the description of the present disclosure.

Those skilled in the art can understand that all or part of the steps carried in the method of the above-described embodiments can be implemented by a program instructing relevant hardware. The program can be stored in a computer-readable storage medium, and when the program is executed, it comprises one of the steps of the method of the embodiments or a combination thereof.

In addition, the functional units in the embodiments of the present disclosure may be integrated into one processing module, or each unit may exist alone physically, or two or more units are integrated into one module. The integrated module can be achieved in the form of hardware, and can also be achieved in the form of a software functional module. If the integrated module is implemented in the form of a software functional module and is sold or used as a separate product, it may also be stored in a computer-readable storage medium.

It should be understood by those skilled in the art that embodiments of the present disclosure may be provided as a method, a system, or a computer program product. Accordingly, the present disclosure may take the forms of a hardware-only embodiment, a software-only embodiment or an embodiment combining software and hardware. Furthermore, the present disclosure may take the form of a computer program product implemented on one or more computer-usable storage media (comprising, but not limited to, disk memory, optical memory and the like) containing computer-usable program codes.

The present disclosure is described with reference to flowcharts and/or block diagrams of a method, a device (system), and a computer program product according to the embodiments of the present disclosure. It should be understood that each procedure and/or block of the flowcharts and/or block diagrams, and a combination of procedures and/or blocks in the flowcharts and/or block diagrams, can be implemented by computer program instructions. These computer program instructions may be provided to a processor of a general purpose computer, a dedicated computer, an embedded processor or other programmable data processing device to produce a machine, such that the instructions executed by the processor of the computer or other programmable data processing devices produce a means for implementing the functions specified in one or more procedures in the flowcharts and/or one or more blocks of block diagrams.

These computer program instructions may also be stored in a computer-readable memory that can direct a computer or other programmable data processing devices to operate in a particular manner, such that the instructions stored in the computer-readable memory produce a product comprising an instruction means which implements the functions specified in one or more procedures in the flowcharts and/or one or more blocks of block diagrams.

These computer program instructions may also be loaded onto a computer or other programmable data processing devices to allow a series of operation steps to be performed on the computer or other programmable apparatus to produce a computer implemented process, such that the instructions executed on the computer or other programmable devices provide steps for implementing the functions specified in one or more procedures in the flowcharts and/or one or more blocks of block diagrams.

While the above examples of the present disclosure have been described, additional variations and modifications can be made to those examples by those skilled in the art once they learn of the basic inventive concepts. Therefore, the accompanying claims are intended to be interpreted as including the above examples and all variations and modifications that fall within the scope of the present disclosure.

It will be apparent to those skilled in the art that variations and modifications may be made to the present disclosure without departing from the spirit and scope of the present disclosure. Thus, if such modifications and variations of the present disclosure fall within the scope of the claims of the present disclosure and the equivalents thereof, the present disclosure is intended to include such modifications and variations as well.

What is claimed is:

1. A pose estimation method, comprising:
   receiving a plurality of images acquired by a camera and inertial data acquired by an inertial measurement unit in a moving process of an object, the camera and the inertial measurement unit being fixedly installed on the object;
   constructing a visual observation model constraint according to the images;
   constructing a motion model constraint according to the inertial data; and
   calculating, according to the visual observation model constraint and the motion model constraint, poses of the camera, the inertial measurement unit or the object at times of the images;
   wherein calculating, according to the visual observation model constraint and the motion model constraint, poses of the camera, the inertial measurement unit or the object at times of the images comprises:
   obtaining a state variable of the inertial measurement unit according to the visual observation model constraint and the motion model constraint; and
   calculating the poses of the camera, the inertial measurement unit or the object at the times of the images according to the state variable of the inertial measurement unit.

2. The method according to claim 1, wherein constructing the visual observation model constraint according to the images comprises at least one of:
   constructing a local visual observation model constraint according to registration errors of features in the images; or
   constructing a global visual observation model constraint according to registration errors of features in a map and corresponding features in the images.

3. The method according to claim 1, wherein constructing the motion model constraint according to the inertial data comprises:
   constructing a time sliding window comprising a preset number of images of the plurality of images; and
   constructing the motion model constraint according to the inertial data acquired during a period of time when the preset number of images are captured.

4. The method according to claim 3, wherein constructing the visual observation model constraint according to the images comprises at least one of:
   constructing a local visual observation model constraint according to registration errors of features in the preset number of images within the time sliding window; or
   constructing a global visual observation model constraint according to registration errors of features in the preset number of images within the time sliding window and features in a map.

5. The method according to claim 2, wherein the features in the images comprise projection features and real features, and the method further comprises:
   determining the projection features and the real features according to the features in the map; and
   calculating the registration errors according to the projection features and the real features;
   wherein the features in the map comprise at least one of a lane line and a traffic sign.

6. The method according to claim 1, wherein the motion model constraint comprises at least one of:
   a pre-integration factor constraint associated with the inertial data;
   an input noise constraint associated with the inertial data; or
   a measurement value deviation constraint associated with the inertial data.

7. The method according to claim 6, further comprising:
   processing the inertial data to obtain a pre-integration amount of a state variable of the inertial measurement unit at a time of a current image; and
   calculating a residual error of the state variable according to the pre-integration amount and a state variable of the inertial measurement unit at the time of a previous image to serve as the pre-integration factor.

8. The method according to claim 1, wherein the state variable comprises at least one of: displacement, velocity, direction, gyroscope bias or jitter factor of the inertial measurement unit.

9. The method according to claim 1, wherein obtaining the state variable of the inertial measurement unit according to the visual observation model constraint and the motion model constraint comprises:
   calculating the state variable of the inertial measurement unit within a time sliding window at the time of each current image according to the visual observation model constraint and the motion model constraint; and
   updating the state variable of the inertial measurement unit within the time sliding window at the time of at least one previous image.

10. The method according to claim 1, further comprising:
    constructing a relationship between the visual observation model constraint, the motion model constraint and the state variable as the following expression:

$$X^* = \underset{X}{\operatorname{argmin}} \|r_p(X)\|^2 + \sum_{k \in B} \left\| r_\mathcal{B}\left(Z_{B_{k+1}}^{B_k}, X_k\right) \right\|_{\Sigma_{\mathcal{B}_k}} + \sum_{k \in B} \left( \sum_{i \in C_d} \left\| r_{C_d}(Z_i, X_k) \right\|_{\Sigma_d} + \sum_{i \in C_s} \left\| r_{C_s}(Z_i, X_k) \right\|_{\Sigma_s} \right)$$

wherein x* represents the state variable; argmin represents a variable set when a posterior probability takes a minimum value; $r_p(X)$ represents a priori item of marginalization at a previous time; $r_\mathcal{B}(Z_{B_{k+1}}^{B_k}, X)$ represents the pre-integration factor of the inertia measurement unit; $r_{C_s}(Z_i, X_k)$ represents a residual error of a visual solid lane line constraint at time k in a time sliding window; $Z_i$ in the solid line projection factor represents visual observation of a sampling point of an $i^{th}$ lane line; $r_{C_d}(Z_i, X_k)$ represents a geometric residual error of a virtual dashed lane line endpoint constraint within the time sliding window at time k; $Z_i$ in the dashed line projection factor represents visual observation of the $i^{th}$ dashed lane line point; $\Sigma_d$ and $\Sigma_s$ represent observed covariances of solid lane line points and dashed lane line points, respectively; and $\Sigma_{B_k}$ represents a covariance of pre-integration.

11. The method according to claim 1, further comprising:
    in response to a number of the acquired images being smaller than a preset number, implementing visual-only camera pose prediction on consecutive image frames to obtain the camera pose at the time of each image frame; and in response to the number of the acquired images being larger than or equal to the preset number, calculating an initialization value of the state variable of the inertial measurement unit so as to implement fused camera pose prediction according to the inertial measurement unit and the camera;

wherein the initialization value of the state variable is calculated based on the camera poses of the preset number of images.

12. The method according to claim 11, wherein the visual-only camera pose prediction comprises:
   determining a map according to position information of a global positioning system; and
   calculating the poses at the times of the images according to registration constraints of features in the map and corresponding features in the images.

13. The method according to claim 11, wherein calculating an initialization value of the state variable of the inertial measurement unit comprises:
   calculating relative poses between adjacent images within a time sliding window; and
   calculating an initial gyroscope bias of the inertial measurement unit according to a rotation change amount of the relative poses and an angular velocity increment of the inertial data between the adjacent images.

14. The method according to claim 13, wherein calculating an initialization value of the state variable of the inertial measurement unit comprises:
   calculating an initial acceleration of the inertial measurement unit according to a camera pose trajectory of the images within the time sliding window and a displacement increment of the inertial data between the adjacent images; and
   calculating an initial velocity of the inertial measurement unit according to the initial gyroscope bias and the initial acceleration.

15. A computing system, comprising a memory and one or more processors in communication with the memory, wherein
   the memory stores instructions executable by the one or more processors therein, and the instructions, when executed by the one or more processors, cause the one or more processors to implement a pose estimation method comprising:
   receiving a plurality of images acquired by a camera and inertial data acquired by an inertial measurement unit in a moving process of an object, the camera and the inertial measurement unit being fixedly installed on the object;
   constructing a visual observation model constraint according to the images;
   constructing a motion model constraint according to the inertial data; and
   calculating, according to the visual observation model constraint and the motion model constraint, poses of the camera, the inertial measurement unit or the object at times of the images;
   wherein calculating, according to the visual observation model constraint and the motion model constraint, poses of the camera, the inertial measurement unit or the object at times of the images comprises:
   obtaining a state variable of the inertial measurement unit according to the visual observation model constraint and the motion model constraint; and
   calculating the poses of the camera, the inertial measurement unit or the object at the times of the images according to the state variable of the inertial measurement unit.

16. A non-transitory computer-readable storage medium, storing instructions thereon, wherein the instructions, when executed by a processor, cause the processor to implement a pose estimation method comprising:
   receiving a plurality of images acquired by a camera and inertial data acquired by an inertial measurement unit in a moving process of an object, the camera and the inertial measurement unit being fixedly installed on the object;
   constructing a visual observation model constraint according to the images;
   constructing a motion model constraint according to the inertial data; and
   calculating, according to the visual observation model constraint and the motion model constraint, poses of the camera, the inertial measurement unit or the object that at times of the images;
   wherein calculating, according to the visual observation model constraint and the motion model constraint, poses of the camera, the inertial measurement unit or the object at times of the images comprises:
   obtaining a state variable of the inertial measurement unit according to the visual observation model constraint and the motion model constraint; and
   calculating the poses of the camera, the inertial measurement unit or the object at the times of the images according to the state variable of the inertial measurement unit.

17. The non-transitory computer-readable storage medium according to claim 16, wherein constructing the visual observation model constraint according to the images comprises at least one of:
   constructing a local visual observation model constraint according to registration errors of features in the images; or
   constructing a global visual observation model constraint according to registration errors of features in a map and corresponding features in the images.

18. The non-transitory computer-readable storage medium according to claim 16, wherein constructing the motion model constraint according to the inertial data comprises:
   constructing a time sliding window comprising a preset number of images of the plurality of images; and
   constructing the motion model constraint according to the inertial data acquired during a period of time when the preset number of images are captured.

19. The non-transitory computer-readable storage medium according to claim 18, wherein constructing the visual observation model constraint according to the images comprises at least one of:
   constructing a local visual observation model constraint according to registration errors of features in the preset number of images within the time sliding window; or
   constructing a global visual observation model constraint according to registration errors of feature in the preset number of images within the time sliding window and feature in a map.

* * * * *